United States Patent Office 3,566,325
Patented Feb. 23, 1971

---

3,566,325
ELECTRICAL CIRCUIT PROTECTION ARRANGEMENT
Mario Paganelli, Via Col di Lana 8, Varese, Italy
Continuation-in-part of application Ser. No. 626,506, Mar. 28, 1967. This application Sept. 10, 1969, Ser. No. 865,223
Int. Cl. H01h 85/24, 85/56
U.S. Cl. 337—7      11 Claims

---

ABSTRACT OF THE DISCLOSURE

A circuit-protecting device including a housing provided with an aperture for removably receiving an electric fuse. The aperture is provided with a biased closure device which blocks the aperture opening when the fuse is removed. The closure device is automatically yieldable for unblocking the aperture in response to the insertion of the fuse into the housing.

---

CROSS REFERENCE TO RELATED APPLICATIONS

This is a continuation-in-part application of my copending application, Ser. No. 626,506, now abandoned.

BACKGROUND OF THE INVENTION

The present invention resides in an electric circuit protection device which includes a differential magnetothermic switch and a fuse holder with rapid interrupting capability.

A primary object of the present invention is to provide an electrical device which is capable of protecting an entire electrical plant or apparatus which uses electrical power to operate as, for example, machine tools. It is also the object of the present invention to provide a device which guards against electric current losses, electrical overloads, short circuits, etc. The device of the present invention has, furthermore, the object of being applicable to current and future requirements which may be anticipated in the usage of energy in modern plants where the occurrence of short circuits or excessively high currents may result in severe damage to property and/or life.

A further object of the present invention is to provide an electrical circuit protection device with circuit interrupting capability which is applicable over very wide limits as a result of sub-dividing the current flow being guarded. In the device of the present invention, the flow of current is divided between the magnetothermic switch and the protective fuse or fuses being used in conjunction with the switch. In a specific illustration, for example, the magnetothermic switch may be designed to promptly interrupt the circuit within the range of 2500 to 3000 amperes. At the same time, the fuse is interconnected with the magnetothermic switch so that when these limits of current are exceeded, the fuse will rapidly interrupt or disconnect the electrical circuit so as to prevent the destruction of the magnetothermic switch.

It is another object of the present invention to provide an electrical protective device, as described above, in which the fuse is held by a holder which can be applied only if the correct fuse is used, as prescribed by the particular manufacturer of the equipment which is to be protected through the fuse. With such an arrangement, a burnt-out fuse can be replaced only with one of equal electrical characteristics and capacity, so that injury possible to the equipment through the introduction of the incorrect size of fuses, is prevented. Another object of the present invention, is to provide an electric circuit protection device having a combined magnetothermic switch and a fuse holder, so that the device may be readily mounted in place without the use of special tools, and may be quickly adapted to walls or structural members used to support the device. At the same time the electrical terminals of the device are made readily accessible so that the external circuit which is to be protected by the device, may be connected to the device with ease and without requiring special disassembly of the device.

It is also a further object of the present invention to provide a protection device with the preceding characteristics which is, at the same time, sealed with a security seal, so that unauthorized personnel may not tamper with the device or gain access into the interior construction of the device, and thereby possibly introduce a fuse which would not adequately protect either the equipment in the electrical circuit, or the magnetothermic switch.

Heretofore, circuit breakers have been used in conjunction with series-connected fuses for the purpose of increasing the current-interrupting capacity for current surges significantly larger than the interrupting capacity of a standard low-voltage circuit breaker. The fuses were accordingly designed so that they would burn out immediately if the current surge exceeded the capacity of the circuit breaker. Thus, if for example, a 3500-ampere circuit breaker were used, the fuse was designed so as to blow or interrupt the circuit above 3500 amperes. It was the purpose of using such a size fuse, to avoid frequent burn-out of the fuse while, at the same time, assuring that the fuse be burned out immediately when the circuit breaker interrupting capacity is exceeded. It is essential that the fuse behave in this manner if the circuit breaker is not to be destroyed through excessive currents.

The constructions of such protection devices, heretofore, have had the inherent disadvantages that incompetent users were capable of replacing the burnt-out fuse with an improperly sized fuse, not having the proper current carrying capacity. Under such circumstances, it is possible that the circuit breaker may burn out and become destroyed, when the fuse with the incorrect rating cannot properly protect the circuit breaker. In addition, past designs of circuit breakers and fuses, have made it necessary to open the housing of the device when replacing the fuse. In this manner, the circuit breaker was exposed and was made accessible to inadvertent contact by the user. Through such exposure of a person to the terminals of the circuit breaker, danger of possible injury to the person existed, and as a result these devices, in the past, had to be designed so that the circuit breakers were in their open positions when the housing became opened for the purpose of replacing a fuse. The requirements for thus interlocking the circuit breaker with the enclosure or case of a housing so that the circuit breaker will be opened when a fuse becomes replaced, incurs a complexity of maintenance, and is therefore an undesirable feature of such past protective devices. A specific feature of the present invention resides in the condition that the fuse may be replaced without the danger of possibly contacting any terminals of the circuit breaker. Thus, the fuse utilized in the device of the present invention can be replaced without requiring the opening of the housing. At the same time, the circuit breaker is no longer made accessible during this procedure of replacing the fuse, and danger of injury to the fuse installer is, therefore, avoided. Furthermore, the possibility of replacing the fuse with an improperly rated fuse is avoided because the configuration of the fuse is coordinated with the configuration of the fuse socket so that only a fuse of proper electrical parameters can be inserted into the socket to fuse the circuit.

Accordingly, a principal object of the present invention is to provide a circuit protecting arrangement in which the current capacity is divided between the circuit breaker and the fuse. When, for example, a circuit breaker with capacity of 8500 amperes is used for short-circuit conditions, the fuse is designed to melt or interrupt the circuit only when current flow of 8500 amperes is exceeded, up to a range of, for example, 40,000 amperes. In applying the device of the present invention, it is essential to note that fuses with equal dimensions and even with equal voltage and current ratings, will not have necessarily identical circuit interrupting characteristics. Thus, different manufacturers may supply fuses with equal voltages and current ratings, and they may even be of the same dimenisons. Such fuses, however, are not necessarily identical in their circuit interrupting characteristics. This feature prevails particularly when taking into account the different manufacturing practices of different countries.

It is of special use, therefore, to provide a circuit protection device which has a specific arrangement by which the particular fuse with the required circuit interrupting characteristics may be inserted into the circuit. Thus, it is not desirable to rely merely on the actual dimensions of a fuse, but to provide a keying arrangement which is independent of such dimensions of the fuse which may not possess the essential electrical characteristics.

A specific feature of the present invention also resides in the condition that a differential is used in combination with the magnetothermic circuit breaker. Such a differential circuit, or ground leakage current circuit is an essential feature because it protects the user of, for example, electrical household appliances, machine tools, against short-circuit and against electrical discharges to ground. Such discharges may result from improper insulation of the electrical parts, and are a potential danger to the user of the equipment or appliances.

SUMMARY OF THE INVENTION

A circuit protection device in which a hollow female member of electrically insulating material has an opening of predetermined outline and is provided with terminals for connecting to a source of electrical energy. A male member having two shell sections defining together a first portion in a configuration which is insertable through the opening and into the interior of the female member. The male member also has a hollow second portion rigid with the first portion, and has further connecting means which extends through the first portion and connects the shell sections with one another. A first contact arrangement provided on the first portion of the male member includes a first pair of contacts located at opposite sides of the connecting means. The circuit fuse used in conjunction with the protection device is inaccessibly arranged with the second portion in electrically conductive connection with the first contact arrangement. A second contact arrangement is located within the female member and is conductively connected with the terminals so as to engage the first contact arrangement on introduction of the first portion of the male member into the interior of the female member. A closure plate located inwardly and adjacent to the opening of the female member is mounted for movement inwardly and away from the opening in response to insertion of the first portion of the male member through the opening into the female member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a sectional view through the longitudinal axis of the device of FIG. 1, and shows the internal parts and elements in cooperative relationship.

DESCRIPTION OF THE PREFERRED EMBODIMENTS

Figure 1:
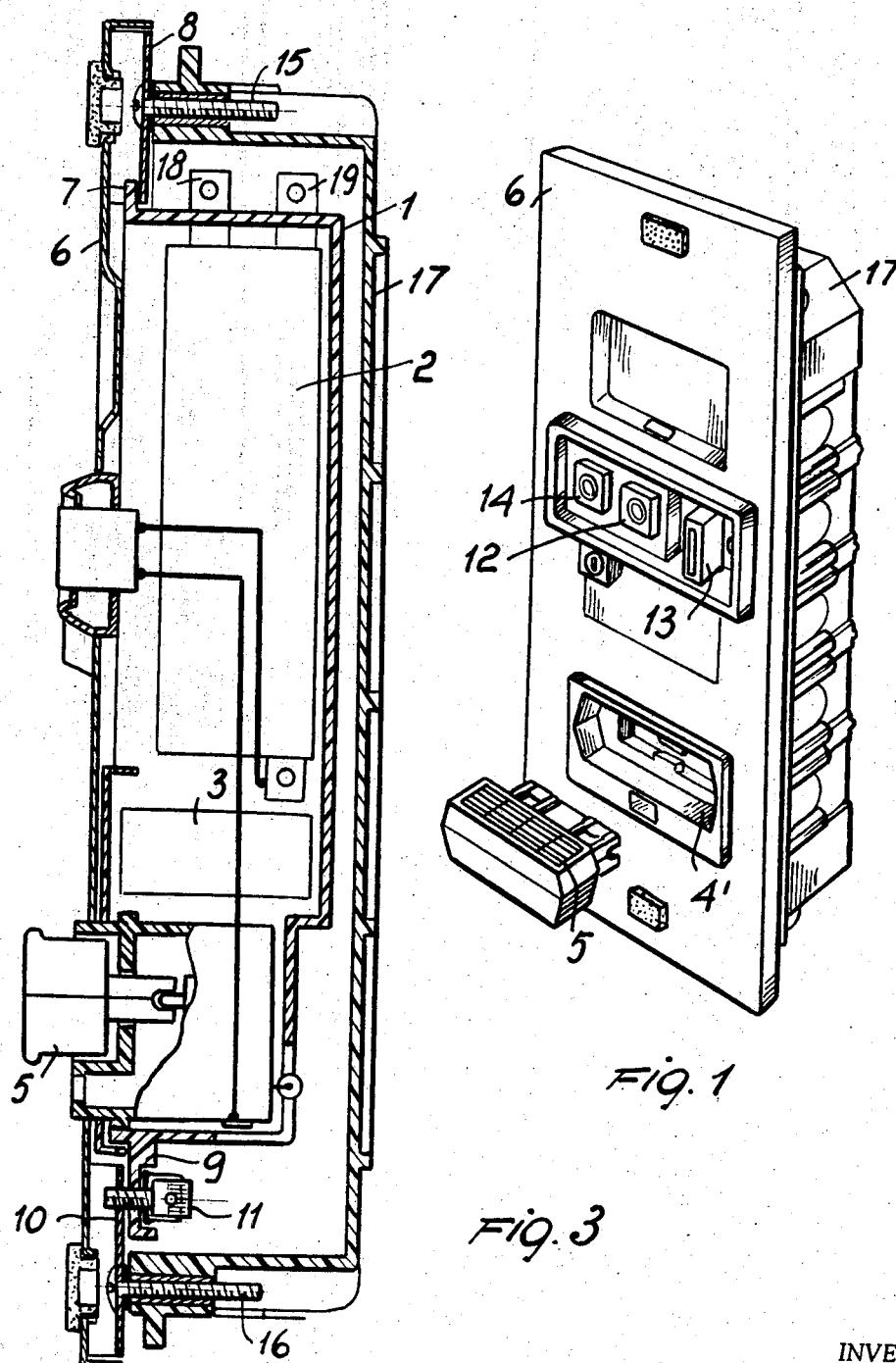
FIG. 1 is an isometric view of the electrical circuit protective device, with a unipolar switch, in accordance with the present invention.
Figure 2:
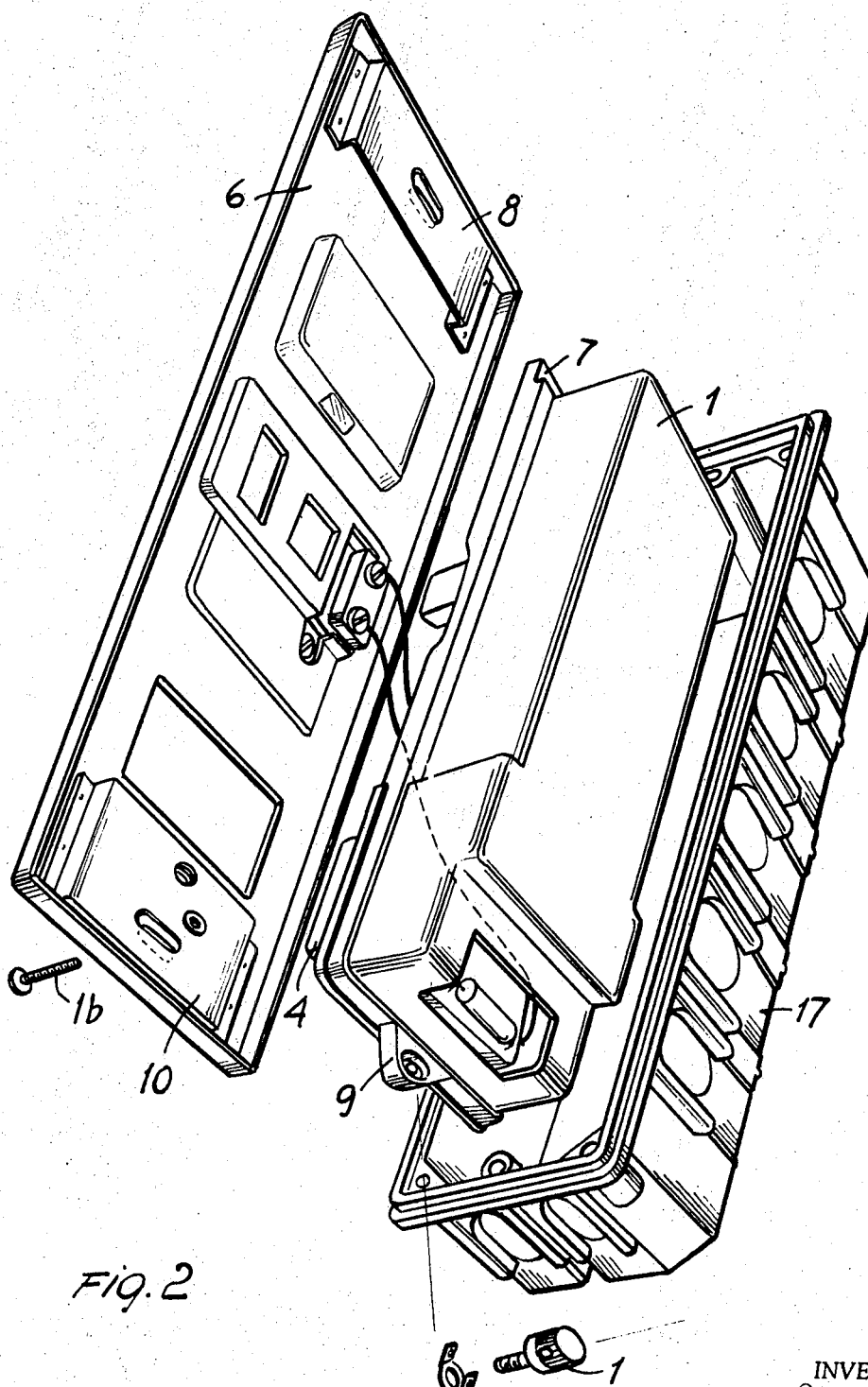
FIG. 2 is an exploded isometric view of the protective device of FIG. 1, and shows the relationship of the various subassemblies.

Referring to the drawing, and in particular, to FIGS. 1–3, the device of the present invention has a housing 1 made of electrically insulating material. A magnetothermic switch 2 is mounted on the housing which is also provided with a socket 4 which serves as a receptacle for a plug-shaped fuse holder 5. The magnetothermic switch 2 is coupled with a differential circuit 3.

The rear face of a front plate 6 is mounted against the housing 1 along a border 7. Securing strips 8 are connected to the plate 6, and lugs 9 are provided for mounting the combination of the plate 6 with strips 8 in place. A strip 10 similar in design to that of strip 8 is secured to the plate 6 at the opposite end of the plate, at which the strip 8 is mounted. A screw 11, for example, passes through an opening in the lug 9 and through the strip 10, and thereby holds the plate 6 in assembled form, in place. This screw 11 nails or serves as a security seal in the form of a lead seal through a piece of adapted wire.

The contour of the opening of the socket 4 has a predetermined shape, as well as predetermined dimensions, so as to admit a fuse holder which is no other than one having the very specific electrical and mechanical characteristics specified by the manufacturer to be used for protecting the equipment in the circuit of the fuse. Thus, the contour of the opening of the socket 4 serves as a key by which only a very particular fuse holder carrying a fuse of predetermined electrical mechanical characteristics, may be admitted through the opening of the socket 4.

The plate 6 has also cut-outs or openings along its face for admitting and exposing the operating controls 12, 13, and 14 of the differential switching device 3. A lower opening 4' is provided for cooperating with the socket 4. The opening portion of the socket 4 is of a predetermined configuration which permits the interchange of fuse holders or parts that are only identical. In this manner, devices that appear alike as a result of their dimensions, cannot be applied if their electrical characteristics are not also identical. Thus, the very special design of the opening contour 4 assures protection for the equipment, as specified by the manufacturer.

Figure 4:
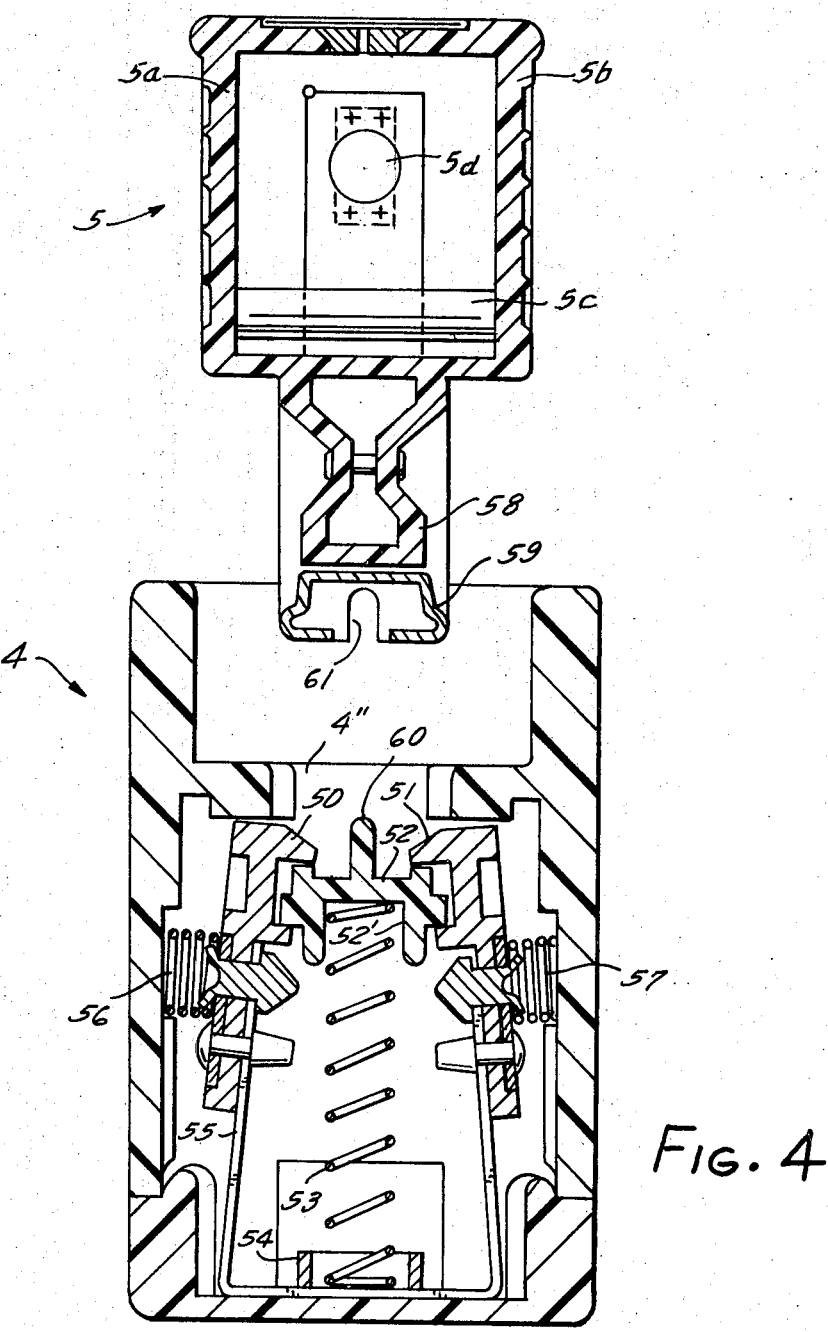
FIG. 4 is a sectional view through the socket in the device of FIG. 1 for holding the fuse.

The fuse 5d within the holder 5 (see FIG. 4) has the electrical characteristic through which it can rapidly interrupt or open the electrical circuit, when the current flow through the circuit exceeds a predetermined limit, which is beyond the limit for safe operation of the magnetothermic switch. As a result of this characteristic by which the circuit is very rapidly interrupted or opened, this magnetothermic switch is adequately protected against excessive currents which may appear in sudden surges.

In accordance with the present invention, therefore, a device for relatively low electric currents is provided while, at the same time, it has very rapid circuit interrupting or circuit opening characteristics, and is thereby able to control higher rating of the device, economies are realized in manufacture, and simultaneously benefit from the feature that circuit interruption or circuit opening is also rapidly realized in the event of low short-circuit currents.

A further advantage of the invention resides in the feature that the device provides electrical plants with large power consumption, and expanded and increased protection resulting through the use of a conventional switch, even with large current flows or current capacities. Thus, as a result of providing the differential device 3, it is possible to control very large current flows through the application of considerably smaller currents through the switching device 2.

The plate 6 is mounted onto the housing 17 through screws 15 and 16 which enter the strips 8 and 10 within the housing 17 which, in turn, encloses the housing 1. The housing 17 serves as the means which may be embedded in walls or which may be secured to suitable supporting means on the surface of walls or construction members.

The magnetothermic switch 2 can also be constructed and designed to comprise three poles with three sockets 5 for the purpose of receiving three fuse holders each associated with one phase of the polyphase alternating current. Thus, the magnetothermic switch 2 may be adapted readily to the protection of equipment fed from three-phase alternating current supplies. Such application of the magnetothermic switch 2, in accordance with the present invention, does not require provision for accommodating variable operating conditions, since the sockets for a specific application are always supplied by the manufacturer of the equipment to be protected.

The device, in accordance with the present invention, may be mounted easily and quickly by simply securing it to the operating location, and connecting the appropriate electrical wires to the input and output terminals of the device which are indicated through the reference numerals 18 and 19 of the drawing. These wires connected to the terminals 18 and 19 originate from the machine, apparatus and/or appliance to be supplied with electrical energy and to be protected through the device of the present invention.

To further guard against inserting the incorrect fuse holder into the circuit to be protected, the socket 4 is provided with an auxiliary keying arrangement consisting of movable keying members 50 and 51 which project into the opening 4″. When in the position, shown in FIG. 4, the socket or receptacle 4 does not contain the fuse holder 5, and in this position of the keying member 50 and 51, a covering plate member 52 covers effectively the opening 4″ so that a person cannot, for example, insert his finger through the opening. The covering plate 52 is held in the closed or covering position through a spring 53 held in place through a bushing 54 at one end, and a recess 52′ within the cover plate 52. Thus, the covering plate 52 is firmly held against the keying member 50 and 51 when a fuse holder has not been inserted into the socket 4. The keying member 50 and 51 are, in turn, secured to a bracket or fork-shaped member 55 which is biased in the position shown, through springs 56 and 57. These latter springs produce the ink-lined sides of the bracket 55 so that the keying member 50 and 51 will project into the opening space 4″, in the absence of a fuse holder 5 of the appropriate design.

The fuse holder 5 itself has two shell sections 5a and 5b connected by suitable connecting means 5c, and is provided with a bracket portion 58 which, in turn, supports the key portion 59. The latter is shaped so that it conforms precisely to the contour of the opening 4″, as well as that particular outline by which the keying members 50 and 51 may be forced apart so as to admit the fuse holder into the socket 4 appropriately. Thus, several such members 50 and 51 may be situated along the rim or edge of the opening 4″, and the member 59 is shaped so as to correspond directly to these members 50 and 51 so that they will become forced apart as the holder 5 becomes admitted into the socket 4. The key member 59 is provided with a slot 61 specifically designed to mate with the projecting portion 60 of the covering plate 52. As the fuse holder 5 is pushed into the socket 4, the covering plate 52 is depressed against the action of the spring 53, so that the opening 4″ becomes cleared for admitting the holder 5. Through the application of the arrangement of FIG. 4, a very secure design is realized which prevents any operator or maintenance personnel to insert a fuse holder with the incorrect rating. At the same time, the arrangement of FIG. 4 prevents any one from inserting a tool or finger into the opening of the socket, through which possible injury may be incurred to the equipment or to the person himself.

It will be understood that each of the elements described above, or two or more together, may also find a useful application in other types of constructions differing from the types described above.

While the invention has been illustrated and described as embodied in electric circuit protection apparatus, it is not intended to be limited to the details shown, since various modifications and structural changes may be made without departing in any way from the spirit of the present invention.

What is claimed as new and desired to be protected by Letters Patent is set forth in the appended claims.

What is claimed is:

1. A circuit protecting device of the character described, comprising the combination of housing means; female socket means provided on said housing means and having an aperture of predetermined configuration; circuit-breaker means arranged in said housing means and having a predetermined operational capacity and a burn-out limit higher than said operational capacity; electric fuse means having a first male portion configurated so as to be matingly receivable in said aperture of said socket means, and a hollow second male portion rigid with said first male portion and accommodating an electric fuse; biased closure means in said socket means and blocking said aperture when said first portion is not received in the same but yieldable for unblocking said aperture in response to insertion of said first portion into said female socket means; and circuit means operatively associated with said circuit-breaker means and said fuse means in such a manner that power surges up to the limit of said operational capacity activate said circuit-breaker means, while power surges in excess of said operational capacity will result in burning-out of said electric fuse before the burn-out limit of said circuit-breaker means is reached.

2. A device as defined in claim 1, said circuit-breaker means being unipolar and said fuse means comprising a single fuse element.

3. A device as defined in claim 1, said circuit-breaker means being a differential magnetothermic switch.

4. A device as defined in claim 1, said circuit-breaker means being three-polar, and said fuse means comprising three-position fuses with each position corresponding to one phase.

5. A circuit protecting device of the character described, comprising in combination, housing means; a hollow female socket member provided on said housing means and having an aperture of predetermined configuration and terminals for connection to a source of electrical energy; circuit-breaker means arranged in said housing means and having a predetermined operational capacity and a burn-out limit higher than said operational capacity; electric fuse means configurated so as to be matingly receivable in said female socket member and including a male member comprising two connected shell sections together defining a first portion configurated so as to be insertable through said opening and into the interior of said female member, and a hollow second portion rigid with said first portion; first contact means provided on said first portion of said male member and including a first pair of contacts, an electric fuse inaccessibly arranged in said second portion in electrically conductive connection with said first contact means, second contact means located within said female socket member conductively connected with said terminals and arranged to engage said first contact means on introducing of said first portion of said male member into the interior of said female socket member, a closure plate located inwardly adjacent said opening of said female socket member and being mounted for movement inwardly away from said opening in response to insertion of said first portion of said male member through said opening into the interior of said female socket member, and biased clamping means operative for holding said closure plate in closed position overlying and closing said opening in response to withdrawal of said first portion of said male member from said opening, and for urging said second contact means into conductive engagement with said first contact means when said first portion of said male member is received in the interior of said female socket member; and circuit means operatively associated with said circuit-breaker means and said fuse means in such a manner that power surges up to the limit of said operational capacity activate said circuit-breaker means, while power surges in excess of said operational capacity will result in burning-out of said fuse before the burn-out limit of said circuit-breaker means is reached.

6. A device as defined in claim 5, said fuse means further comprising connecting means extending through said first portion and connecting said shell sections with one another.

7. A device as defined in claim 6, the contact of said first pair of contacts being located at opposite sides of said connecting means.

8. A device as defined in claim 5, said second contact means being provided on and carried by said biased clamping means.

9. A device as defined in claim 5, said first contact means further comprising a pair of electrically conductive supporting portions spacedly arranged within said second portion of said male member and supporting said electric fuse in electrically conductive engagement with the same and with the respective contacts of said pair of contacts.

10. A device as defined in claim 5, said second contact means including two second pair of contacts, the contacts of each second pair being located transversely spaced from one another and so arranged as to engage a contact of said first pair from opposite sides in response to introduction of said first portion of said male member into the interior of said female member.

11. A device as defined in claim 5, said first portion of said member having a leading face facing said opening of said female member on introduction of said male member into said female member, said leading face being provided with a groove; and wherein said closure plate is provided with a projecting rib facing said opening and being adapted to enter into said groove in response to introduction of said male member into said member to thereby center said first portion and said closure plate with reference to one another.

References Cited

UNITED STATES PATENTS

| | | | |
|---|---|---|---|
| 3,474,373 | 10/1969 | Myers | 337—8X |
| 3,354,277 | 11/1967 | Stanback et al. | 337—8 |
| 3,248,500 | 4/1966 | Cellerini et al. | 337—7 |
| 2,863,969 | 12/1958 | Edmunds | 337—6X |
| 2,846,545 | 8/1958 | Edmunds | 337—211X |
| 2,701,284 | 2/1955 | Edmunds | 337—82X |
| 1,160,386 | 11/1915 | Crouse | 337—225X |

FOREIGN PATENTS

| | | | |
|---|---|---|---|
| 621,316 | 4/1949 | Great Britain | 337—226 |

BERNARD A. GILHEANY, Primary Examiner

D. M. MORGAN, Assistant Examiner

U.S. Cl. X.R.

337—226